F. MOTASKY.
WHEEL.
APPLICATION FILED NOV. 2, 1918.
1,330,384.
Patented Feb. 10, 1920.
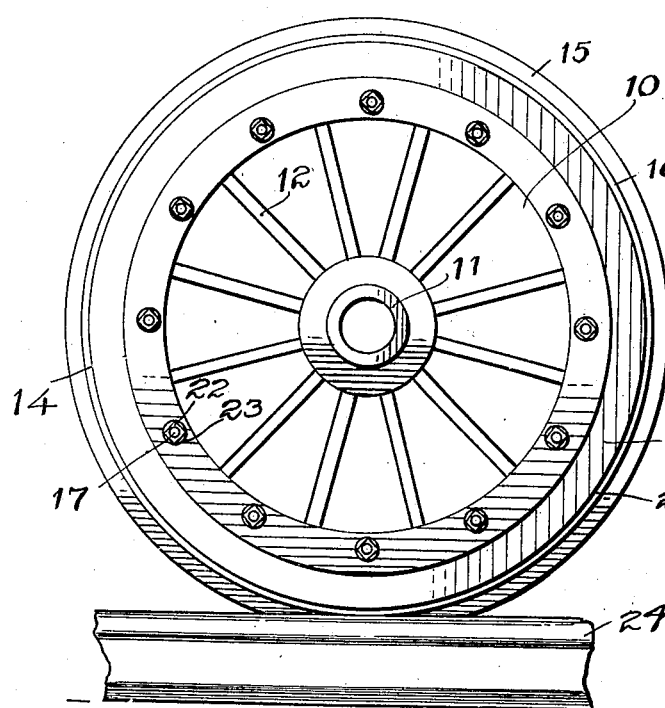
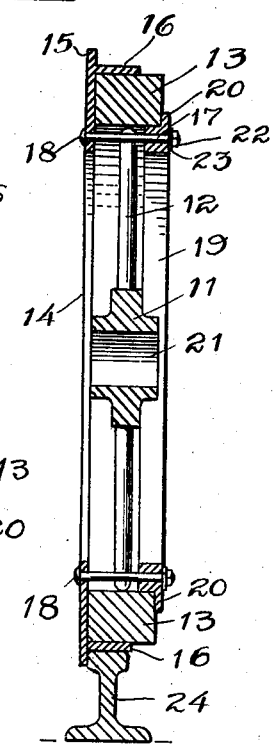
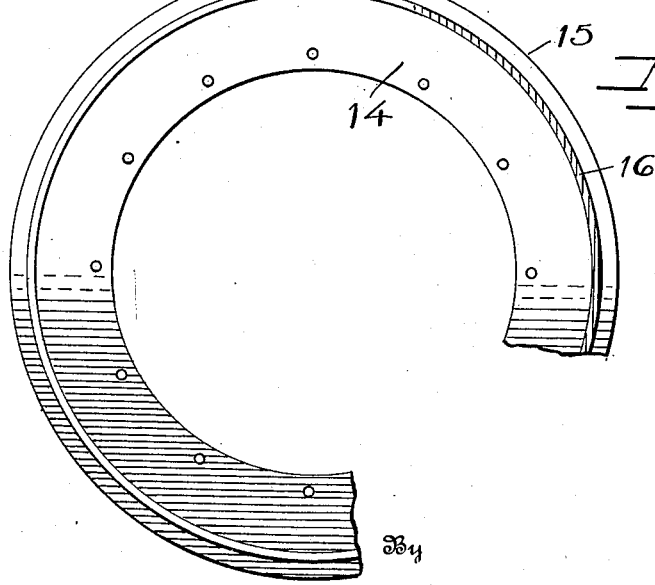
Inventor
Felix Motasky.
By Omar Geier
his Attorney

UNITED STATES PATENT OFFICE.

FELIKS MOTASKY, OF STRATFORD, CONNECTICUT.

WHEEL.

1,330,384.    Specification of Letters Patent.    Patented Feb. 10, 1920.

Application filed November 2, 1918. Serial No. 260,794.

*To all whom it may concern:*

Be it known that I, FELIKS MOTASKY, a citizen of Russia, residing at Stratford, county of Fairfield, and State of Connecticut, have invented certain new and useful Improvements in Wheels, of which the following is a specification.

This invention relates to improvements in wheels, and particularly that class of wheels designed to run alternately upon a rail or upon a plane surface.

Such wheels are particularly advantageous in the case of motor-vehicles used for the transport of goods, which by means of these wheels can be transported by railway, and be unloaded at the end of the rail journey at any desired place not directly located on or near the railroad tracks.

It is the object of the invention to provide a wheel of ordinary construction for use with automobiles, etc., which can easily and without loss of time be converted into a wheel adapted to be run on tracks.

This, and other objects and advantages to hereinafter appear, I attain by means of the construction and combination illustrated in its preferred form in the accompanying drawing, wherein—

Figure 1 is a side view of a wheel constructed according to the present invention, on a piece of rail.

Fig. 2 is a cross-section through the same.

Fig. 3 is a detail view of a portion of a flanged ring.

The wheel 10, comprising the customary hub 11, spokes 12 and tread portion 13 for road use, is adapted to receive a flange ring 14, provided with a flange 15, and rim part 16, integral therewith, and adapted to engage the tread portion 13 with its inner and a rail with its outer face. This ring 14 is adapted to be conveniently secured to the inner face of said wheel 10 by means of bolts 17, resting with their heads 18 against the outer face of the flange ring 14, while their inner ends pass through a ring 19 fitted against the outer face of the wheel 10 by shoulders 20 thereof engaging the similarly shaped tread portion 13. At their outer ends the bolts 17 carry nuts 22 resting against the outer face of washer rings 23 between the outer face of the ring 19 and the inner faces of said nuts.

It will be clear, that by securing the flanged ring 14 to the wheel, with its rim part 16 in engagement with the tread portion 13, and tightening the nuts, the wheel will be easily and quickly changed into a railroad wheel adapted to engage with its flange the head of a rail 24 of a track.

Having thus described my invention, what I claim as new, and desire to secure by Letters Patent is:—

The combination with a road or similar wheel, of a ring, a flange on said ring, a rim portion integral with said flange adapted to engage with its inner face the tread portion of said wheel and with its outer face a track rail, a circular ring provided with shoulders to fit against the shoulders of the tread portion, constituting part of the outer face of said wheel, and means for retaining the parts in their assembled position, substantially as described, and for the purpose set forth.

In testimony whereof I have affixed my signature.

FELIKS MOTASKY.